(12) United States Patent
Machi et al.

(10) Patent No.: US 7,434,970 B2
(45) Date of Patent: *Oct. 14, 2008

(54) MULTI-PLATFORM LED-BASED AIRCRAFT REAR POSITION LIGHT

(75) Inventors: Nicolo F. Machi, Marysville, OH (US); Jeffrey M. Singer, Fairborn, OH (US); Mark A. McKenzie, Delaware, OH (US)

(73) Assignee: Honeywell International Inc., Morristown, NJ (US)

(*) Notice: Subject to any disclaimer, the term of this patent is extended or adjusted under 35 U.S.C. 154(b) by 111 days.

This patent is subject to a terminal disclaimer.

(21) Appl. No.: 10/920,524

(22) Filed: Aug. 18, 2004

(65) Prior Publication Data

US 2005/0201112 A1 Sep. 15, 2005

Related U.S. Application Data

(60) Provisional application No. 60/552,209, filed on Mar. 12, 2004.

(51) Int. Cl.
*B64F 1/20* (2006.01)
(52) U.S. Cl. ...................... 362/470; 362/539
(58) Field of Classification Search ............... 362/470, 362/473–475, 477–479, 486, 493, 538–540, 362/542–548, 549, 294, 373, 800, 487, 507; 340/953, 981, 982, 815.45, 815.73, 815.75, 340/815.76

See application file for complete search history.

(56) References Cited

U.S. PATENT DOCUMENTS

| | | | |
|---|---|---|---|
| 4,663,627 A | 5/1987 | Dennis | |
| 6,354,714 B1 | 3/2002 | Rhodes | |
| 6,461,029 B2 * | 10/2002 | Gronemeier et al. | 362/545 |
| 6,462,669 B1 | 10/2002 | Pederson | |
| 6,483,439 B1 * | 11/2002 | Vukosic | 340/815.65 |
| 6,507,290 B1 | 1/2003 | Lodhie et al. | |
| 6,559,777 B1 | 5/2003 | Martin et al. | |
| 6,568,833 B2 | 5/2003 | Worgan et al. | |
| 6,578,986 B2 | 6/2003 | Swaris et al. | |
| 6,598,998 B2 | 7/2003 | West et al. | |
| 6,641,284 B2 * | 11/2003 | Stopa et al. | 362/240 |

(Continued)

FOREIGN PATENT DOCUMENTS

| | | |
|---|---|---|
| EP | 1168902 A2 | 1/2002 |
| WO | WO-03/068599 A1 | 8/2003 |

OTHER PUBLICATIONS

Honeywell: "Introducing Honeywell Astreon Solid State Lighting for Business Aircraft," Oct. 2003. URL: http://honeywellaes.com/lighting/index.jsp>.

*Primary Examiner*—Hargobind S Sawhney
(74) *Attorney, Agent, or Firm*—Black Lowe & Graham PLLC

(57) ABSTRACT

An aircraft rear position light device (1) has a modular configuration. The device utilizes solid-state light sources. In an exemplary embodiment, the light sources are side-emitting light-emitting diodes (LEDs) (40), which are attached to a heat sink (30). A reflector (200) is positioned next to each of the LEDs. The device further includes an outer lens (10) with an integrated cut-off shield (110) and optical treatments (120). The configuration of LEDs and reflectors, in conjunction with the cut-off shield and optical treatments, allows the emitted light to satisfy predetermined minimum and maximum angular intensity requirements. An electronics module (50) is also attached to the heat sink to connect the LEDs to a power source in the aircraft. Electronic updates may be made by replacing the electronics module.

18 Claims, 4 Drawing Sheets

U.S. PATENT DOCUMENTS

| | | | |
|---|---|---|---|
| 6,669,357 B2 | 12/2003 | Konicke et al. | |
| 6,674,096 B2 | 1/2004 | Sommers | |
| 6,679,621 B2 | 1/2004 | West et al. | |
| 6,799,870 B2 * | 10/2004 | Lin | 362/294 |
| 6,866,394 B1 | 3/2005 | Hutchins et al. | |
| 6,964,507 B2 * | 11/2005 | Mohacsi | 362/545 |
| 6,994,459 B2 * | 2/2006 | Worsdell et al. | 362/470 |
| 7,021,801 B2 * | 4/2006 | Mohacsi | 362/477 |
| 2002/0018009 A1 | 2/2002 | Rast | |
| 2002/0048174 A1 | 4/2002 | Pederson | |
| 2002/0196637 A1 | 12/2002 | Dubin et al. | |
| 2003/0048641 A1 | 3/2003 | Alexanderson et al. | |
| 2003/0107885 A1 | 6/2003 | Galli | |
| 2003/0174499 A1 | 9/2003 | Bohlander | |
| 2004/0208018 A1 * | 10/2004 | Sayers et al. | 362/544 |
| 2005/0068777 A1 * | 3/2005 | Popovic | 362/307 |
| 2005/0093718 A1 * | 5/2005 | Martin | 340/981 |
| 2005/0110649 A1 | 5/2005 | Fredericks et al. | |
| 2005/0111220 A1 | 5/2005 | Smith | |
| 2005/0128759 A1 | 6/2005 | Fredericks et al. | |

* cited by examiner

MULTI-PLATFORM LED-BASED AIRCRAFT REAR POSITION LIGHT

RELATED APPLICATION

This application claims priority under 35 U.S.C. § 119(e) of U.S. Provisional Application No. 60/552,209 filed on Mar. 12, 2004, the entire contents of which are herein incorporated by reference.

FIELD OF THE INVENTION

The present invention is directed to position lighting systems on aircraft, and more particularly to rear position lights utilizing solid-state light sources.

BACKGROUND OF THE INVENTION

In order to prevent collisions with other aircraft, a variety of lights are mounted on the exterior of an aircraft in order to indicate its relative position to the other aircraft in the same general airspace. Such lighting systems include a rear (or aft) position lighting system, which typically comprises a white light installed on the aft of an aircraft. The aircraft's lighting systems also include forward position lights, comprising a red light on the port wing and a green light on the starboard wing. Other aircraft operating in the vicinity of the lighted aircraft can discern the relative position and direction of travel of the lighted aircraft based on the color and movement of the rear and forward position lighting systems.

Federal Aviation Regulations (FARs) specify minimum and maximum light intensities for each of the rear and forward position lights, as a function of the angle of emission. The limitations for maximum intensities, known as "angular cut-offs," are necessary to prevent excess overlap between these position lights so that other aircraft in the same general airspace can accurately discern between the individual position lights of an aircraft. This assists the other aircraft in determining the relative position of the lighted aircraft.

Traditionally, rear (as well as forward) position lighting systems have utilized incandescent lamps as light sources. These systems suffer from several disadvantages. Due to their principles of operation, incandescent lamps have a limited life compared to other light sources (e.g., fluorescent, solid-state, and high intensity discharge lights). The harsh environment under which an aircraft operates can further reduce the life of incandescent lamps. Since aviation safety regulations require that the aircraft's position lights be functioning when the aircraft is operating at night, the frequent failures of incandescent positioning lights may result in delayed flight departures as well as high maintenance costs due to replacement.

Some existing position lighting systems utilize light emitting diodes (LEDs). However, such systems are not suitable as a direct replacement (either in form or fit) for existing incandescent lights. Thus, some level of "retrofitting" is required in order to install these lights on an aircraft.

In addition, known LED-based position lights have been designed as point solutions—not as a common solution suitable for various platforms. Also, these lighting systems require clusters of LEDs in order to meet the FAR requirements. Another problem associated with known LED-based position lights is the variations in photometric distributions associated with LEDs. Such variations can prevent the position lights from achieving the minimum or maximum intensity distributions required by FARs.

SUMMARY OF THE INVENTION

Exemplary embodiments of the present invention are directed to an aircraft rear position light that utilizes solid-state light sources and is compatible with different mounting platforms.

According to an exemplary embodiment, a rear position light device includes a plurality of modular components. The modular design may facilitate the manufacture and assembly of the rear position light device, and allow for easy electronic upgrades.

According to an exemplary embodiment, the modular components of the rear position light device may include an integrated LED and electronic heat sink. This heat sink may include a mounting portion for attaching side-emitting light emitting diodes (LEDs). The heat sink may also include base portion for attaching an electronics module, which includes circuitry that electrically connects the LEDs to a power source in the aircraft. The casting of the integrated LED and electronic heat sink may incorporate cooling fins to provide heat dissipation for the LEDs and electronic circuitry.

In an exemplary embodiment, the modular components may include an integrated reflector and LED fastener for each side-emitting LED attached to the heat sink. The two integrated reflector and LED fasteners may be fastened together (e.g., in a snap connection) to securely clamp each side-emitting LED in place with respect to the integrated LED and electronic heat sink. In addition, the reflector on each of these fasteners may be configured based on the distribution of the corresponding side-emitting LED to help ensure that the light distribution characteristics of the rear position light device satisfies Federal Aviation Requirements (FARs).

In another exemplary embodiment, the rear position light device may include an outer lens module and a terminal module to be connected with the integrated LED and electronic heat sink.

The outer lens may include optical treatments that work in conjunction with the reflectors to provide the proper light distribution. In addition, the outer lens module may integrally incorporate cut-off shields designed to effectively limit the light pattern to satisfy FARs relating to the overlap between the rear position light and the forward position lights of the aircraft.

The terminal may comprise a module attached to the heat sink to provide electrical connections between the electronics module and the leads of the aircraft's power source.

Further advances in scope of applicability of the present invention will become apparent from the detailed description provided hereinafter. However, it should be understood that the detailed description and specific embodiments therein, while disclosing exemplary embodiments of the invention, are provided by way of illustration only.

BRIEF DESCRIPTION OF THE DRAWINGS

A more complete understanding of the present invention will become apparent from the following description taken in conjunction with the accompanying drawings, wherein.

DETAILED DESCRIPTION OF EXEMPLARY EMBODIMENTS

Figure 1:
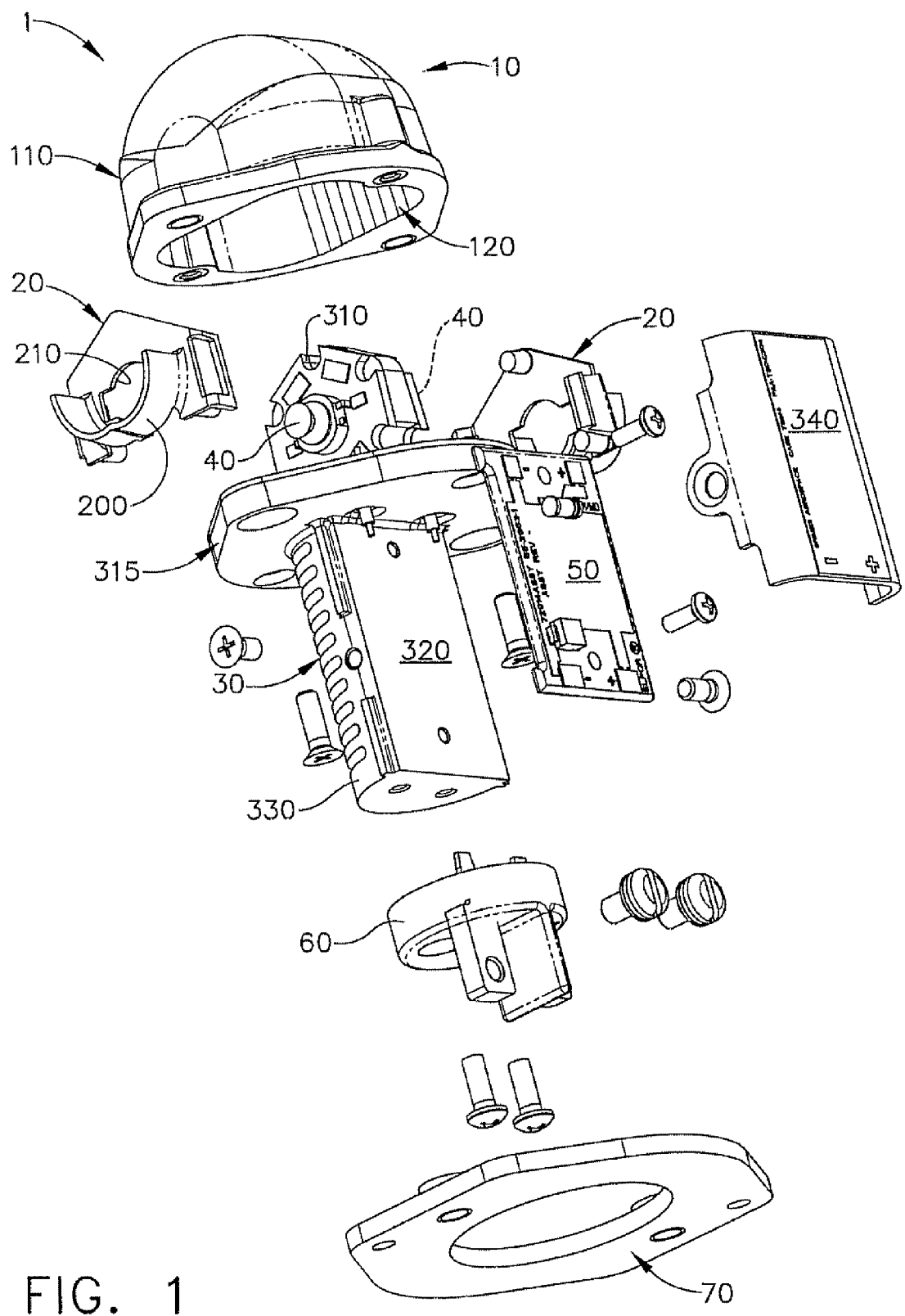
FIG. 1 illustrates an exploded view of a rear position light device, according to an exemplary embodiment of the present invention.

Exemplary embodiments of the present invention are disclosed in the following description.

The present invention is directed to a rear position light device to be mounted on an aircraft (particularly, at the aft of the aircraft) to provide information regarding the aircraft's relative position to other aircraft operating in the same general airspace. According to exemplary embodiments, the rear position light device utilizes solid state light sources, which have a longer operational life and generate less heat than the incandescent light sources used in conventional forward position lighting systems. In addition, this position light device may be portable and capable of being mounted on different types of platforms, in accordance with exemplary embodiments.

Federal Aviation Regulations (FARs)

At this point it may be beneficial to describe some of the requirements imposed on aft position lights by the Federal Aviation Regulations (FARs). It should be noted that the following description is merely provided for illustrative purposes and is not intended to be an exhaustive list of the standards or requirements imposed on rear position lights.

Each position light on an aircraft must show unbroken light within a respective range of angles in the horizontal plane (which contains the longitudinal axis of the aircraft and is perpendicular to the aircraft's axis of symmetry).

According to the FARs, the rear position light must show unbroken white light in a range spanning from 70 degrees (deg.) to the right of the longitudinal axis to 70 deg. to the left of the longitudinal axis, as viewed when looking aft along the longitudinal axis. This angular range is known as dihedral angle A.

The FARs also specify that the forward position light on the port wing (red) must show unbroken light from 0 to 110 deg. to the left of the longitudinal axis of the aircraft, as viewed when looking forward along the longitudinal axis. This angular range is dihedral angle L.

The forward position light on the starboard wing (green) must show unbroken light from 0 to 110 deg. to the right of the longitudinal axis of the aircraft, as viewed when looking forward along the longitudinal axis. This range is dihedral angle R.

As mentioned earlier, FARs indicate specific minimum and maximum light intensities for each of the rear and forward position lights (red and green) of an aircraft as a function of the angle of emission. In the horizontal plane, the FARs specify a minimum light intensity for the rear position light for the angular range defined by dihedral angle A. Specifically, the rear position light intensity must equal or exceed 20 candles within dihedral angle A (according to Part 23, Sec. 23.1393, as of the filing date of the present application).

The FARs also specify the minimum intensities in any vertical plane of the rear and forward position lights, as a function of the minimum intensity of the horizontal plane (I) and the angle above or below the horizontal plane. TABLE 1 illustrates these minimum intensities (in terms of I) in this regulation (according to Part 23, Sec. 23.1393, as of the filing date of the present application).

TABLE 1

| Angle above or below the horizontal plane | Intensity |
| --- | --- |
| 0 deg. | 1.00 × I |
| 0-5 deg. | 0.90 × I |
| 5-10 deg. | 0.80 × I |
| 10-15 deg. | 0.70 × I |
| 15-20 deg. | 0.50 × I |
| 20-30 deg. | 0.30 × I |

TABLE 1-continued

| Angle above or below the horizontal plane | Intensity |
| --- | --- |
| 30-40 deg. | 0.10 × I |
| 40-90 deg. | 0.05 × I |

To prevent excessive overlap between the forward and reverse position lights, the FARs also specify maximum light intensities in the horizontal plane as a function of the angle of emission. In particular, the FARs define the maximum intensity that the rear position light is allowed to have in certain areas that overlap with the dihedral angles L and R (i.e., the angular ranges corresponding to the red and green forward position lights). These limitations are intended to prevent the rear position light from excessively overlap with each forward position light.

(Similarly, the FARs specify maximum intensities for both the red and green forward position lights in certain areas of the adjacent dihedral angle A).

TABLE 2 shows a particular example of the maximum intensities of the white rear position light, as specified in Sec. 1395, Part 23, of the FARs.

Maximum Intensity (Candles)

TABLE 2

| Overlaps | Area A | Area B |
| --- | --- | --- |
| Rear white in dihedral angle L | 5 | 1 |
| Rear white in dihedral angle R | 5 | 1 |

As defined in the FARs, Area A includes all directions in the adjacent dihedral angle (L or R) that pass through the light source of the rear position light and intersect the common boundary plane at more than 10 deg. but less than 20 deg. Area B includes all directions in the adjacent dihedral angle that pass through the light source and intersect the common boundary plane at more than 20 deg.

Accordingly, the specifications illustrated in Table 2 define angular cut-offs for the rear position light. Beyond these angular cut-offs, the intensity of light must be limited at or below the maximum intensities specified in Table 2.

Thus, the FARs specify an angular cut-off for the rear position light at 10 deg. beyond the dihedral angle A into the adjacent dihedral angles L and R, at which the intensity is limited to 5 candles or less. Another angular cut-off is specified for the rear position light at 20 deg. beyond dihedral angle A into adjacent dihedral angles L and R, at which the intensity is limited to 1 candle or less.

It should be noted that the minimum and maximum intensities described above are illustrative of the requirements in Part 23 of the FARs, which pertain to normal, utility, acrobatic, and commuter category airplanes. However, it should be noted that other Parts of the FARs maximum and minimum intensity requirements for other types of aircraft. For example, Part 25 provides the FAR requirements for transport category airplanes, Part 27 provides requirements for normal category rotorcraft, and Part 29 provides the requirements for transport category rotorcraft.

It will be noted that the FARs in these Parts also include other requirements, including position light color specifications for aviation white.

Exemplary Embodiments of the Present Invention

FIG. 1 illustrates an exploded view of a rear position light device 1, according to an exemplary embodiment of the present invention. According to an exemplary embodiment, the rear position light device 1 is modular. The modularity of the device 1 facilitates assembly and allows certain upgrades to be made by replacing one or more of the modules. The exploded view in FIG. 1 shows different modules of the position light device 1, including: an outer lens 10, integrated reflector and LED fasteners 20, an integrated LED and electronic heat sink 30, side-emitting LEDs 40, an electronics module 50, and a terminal 60. An interface bracket 70 may optionally be included.

Integrated LED and Electronic Heat Sink

According to an exemplary embodiment, the integrated LED and electronic heat sink is configured (hereafter, also referred to as "heat sink") includes a mounting assembly 310 and a base assembly 320.

Referring to FIG. 1, the mounting assembly 310 comprises a platform extending toward the outer lens 10. According to an exemplary embodiment, this platform includes two mounting surfaces, which are substantially planar and nearly parallel to each other. (However, a slight angle may exist between these mounting surfaces in an exemplary embodiment.) Since these mounting surfaces are facing substantially opposite directions, they are sometimes referred to hereafter as the "opposing surfaces" of the mounting assembly 310.

During operation, the side-emitting LEDs 40 are attached to the opposing surfaces of the mounting assembly 310, as shown in FIG. 1. Specifically, the side-emitting LEDs 40 are clamped into their respective positions on the mounting assembly 310 using the integrated reflector and LED fasteners 20 (hereafter, also referred to as "LED fasteners"). The LED fasteners 20 may be fastened together, e.g., using snap-fit connectors, on either side of the mounting assembly 310. Thus, each side-emitting LED 40 protrudes through an opening 210 in the corresponding LED fastener 20. The LED fasteners 20 will be described in more detail below.

Referring again to FIG. 1, the heat sink 30 may include an interface portion 315, which has a flat surface substantially perpendicular to the opposing surfaces of the mounting assembly 310. The outer lens module 10 may be fastened to the interface portion 315 of the heat sink 30.

As illustrated in FIG. 1, the interface portion 315 effectively divides the mounting assembly 310 from the base assembly 320. According to the exemplary embodiment, the base assembly 320 may be configured as an elongated body, which includes cooling fins 330. Particularly, the cooling fins may be incorporated in the casting of the heat sink 30 in order to provide enhanced thermal dissipation for the attached side-emitting LEDs 40 and electronics module 50. Furthermore, this casting may be comprised of a heat conducting material that exhibits good heat-dissipating properties.

In an exemplary embodiment, the base assembly 320 includes a surface for attaching the electronics module 50. The electronics module 50 may comprise an interchangeable module (e.g., circuit card), which contains electronic circuitry for electronically connecting the side-emitting LEDs 40 to a power source in the aircraft. The electronics module 50 will be described in more detail below.

According to an exemplary embodiment, the heat sink 30 may also include a cover 340, which is fastened to the base assembly 320 to protect the electronics module 50 from the environment.

Side-Emitting LEDs, Integrated Reflectors and LED Fasteners

According to an exemplary embodiment, the side-emitting LEDs 40 attached to mounting assembly 310 may comprise LUXEON™ side-emitting LEDs (manufactured by Lumileds Lighting), which are currently on the market. However, other types of side-emitting LEDs 40 may be attached to the mounting assembly 310 of the heat sink 30, as will be contemplated by those of ordinary skill in the art.

Figure 2A:
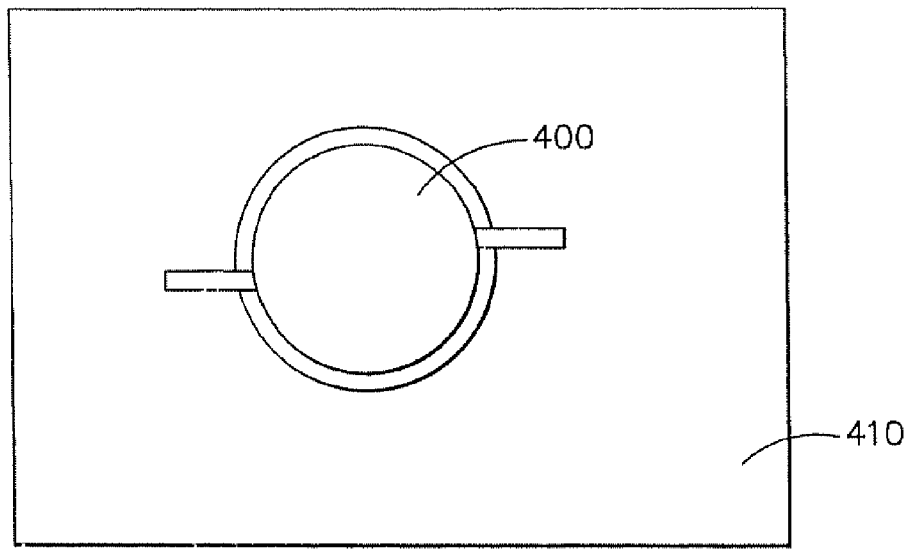
FIGS. 2A and 2B illustrate different views of a side-emitting LED, which is used as a light source according to an exemplary embodiment of the present invention.
Figure 2B:
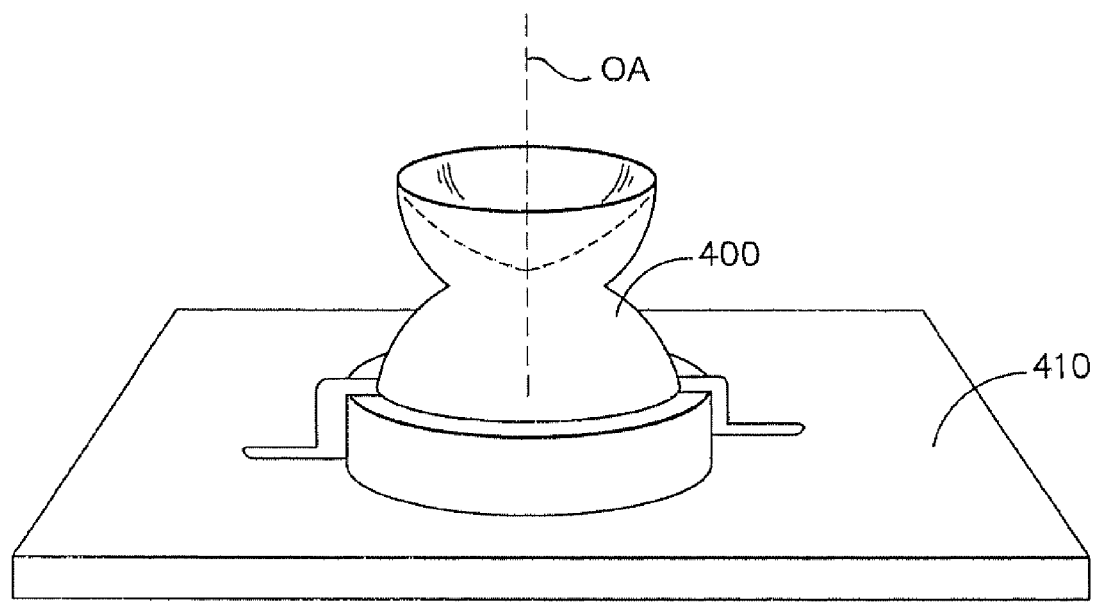

FIGS. 2A and 2B show the configuration of a side-emitting LED 40, according to an exemplary embodiment. Specifically, FIG. 2A illustrates a top view of the side-emitting LED 40, while FIG. 2B illustrates a perspective view. As shown in these figures, each side-emitting LED 40 may include an emitter 400 mounted on a board 410 The board may be, for example, a metal-core PC board. While the board 410 is illustrated as a rectangular board, it will be readily apparent to those ordinarily skilled in the other types of boards 410 may be implemented in the side-emitting LEDs 40. For example, each side-emitting LED 40 may be configured with the hexagonal board illustrated in FIG. 1 (corresponding to the Luxeon Star configuration). FIG. 2B shows a perspective view of the side-emitting LED 40 including the optical axis OA that is incident to the board.

According to an exemplary embodiment, the side-emitting LEDs 40 are clamped to the opposing surfaces of the mounting assembly 310, such that the respective emitters 400 are facing opposite directions (In other words, the emitters 400 of the LEDs 40 are protruding from their respective boards 410 in opposite directions.) However, since each side-emitting LED 40 emits the majority of light through the side of its emitter 400. rather along the optical axis OA, the light distribution of the pair of LEDs 40 will be substantially parallel.

The LED fasteners 20 of FIG. 1 attach the side-emitting LEDs 40 to the mounting assembly 310. In particular, the fasteners 20 may be positioned on either side of the mounting assembly 310 and fastened together, e.g., around the perimeters of the LEDs 40 and the mounting assembly 310. For example, each LED fastener 20 may include one or more connectors that engage in a snap-fit connection around the perimeter of the mounting assembly 310. However, other types of fastening mechanisms may be implemented. Also, in alternative exemplary embodiments, each LED fastener 20 may be fastened to the corresponding surface of the mounting assembly 310, rather than the other fastener 20.

In an exemplary embodiment, each LED fastener 20 is configured to clamp the board 410 of the side-emitting LED 40 against one of the opposing surfaces of the mounting assembly 310, such that the emitter 400 of the LED 40 protrudes through the opening 210 of the fastener 20. Thus, the emitters 400 of side-emitting LEDs 40 will protrude from their respective boards 410 in substantially opposite directions.

Since side-emitting LEDs 40 are configured to emit the majority of light through the sides of the emitters 400, the configuration shown in FIG. 1 orients each LEDs 40 so that a substantial portion of its light distribution is directed in a useful direction (i.e., toward the outer lens 10).

Figure 2C:
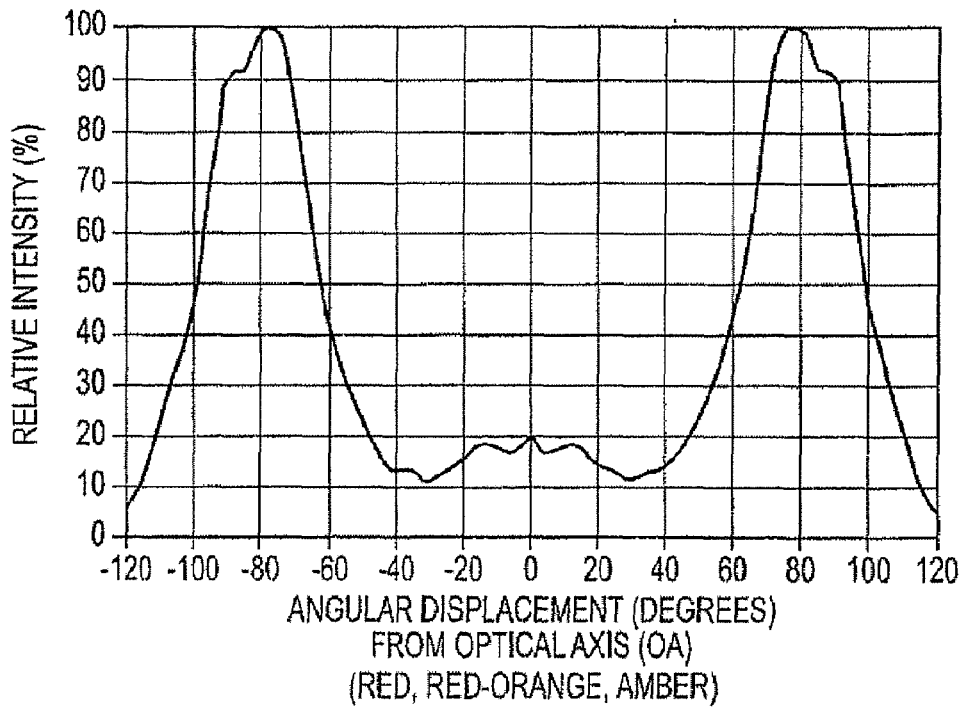
FIGS. 2C and 2D illustrate spatial radiation patterns for exemplary types of side-emitting LED.
Figure 2D:
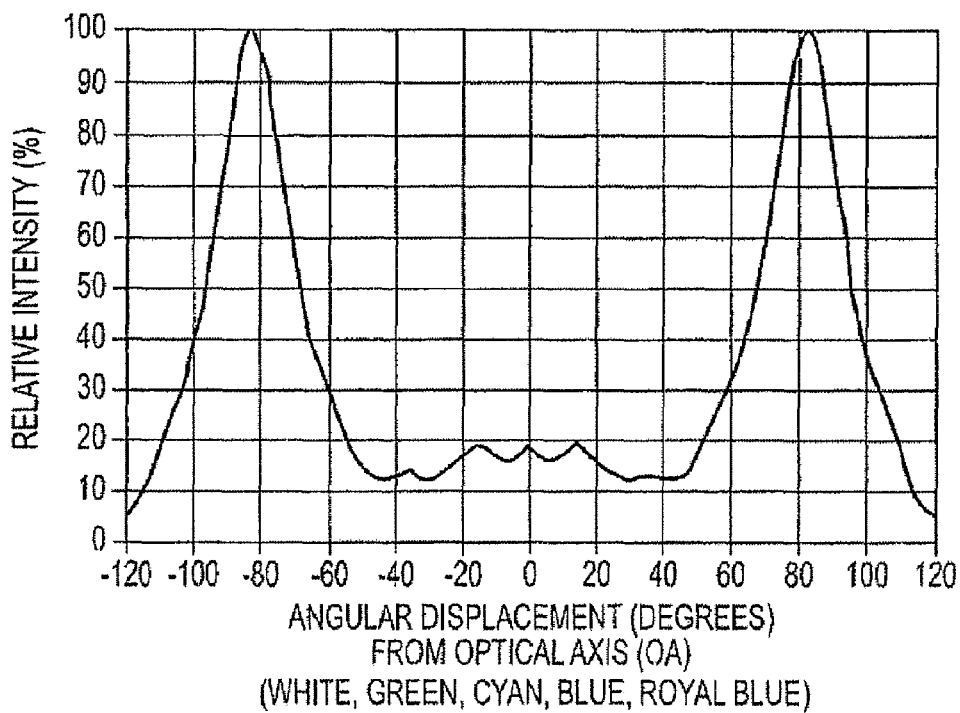

For example, each side-emitting LED 40 is generally configured to emit maximum light intensity from their sides. For example, depending on the color. LUXEON™ side-emitting LEDs exhibit a spatial radiation pattern as shown in FIG. 2C or FIG. 2D. As shown in FIGS. 2C and 2D, distribution of maximum intensity is such that, for the 360 deg. around the optical axis OA of the LED 40, maximum intensity is achieved in the range of 60-100 deg. off the optical axis OA. In an exemplary embodiment, the optical axis OA of each side-emitting LEDs 40 may be oriented so that a portion of the LED's 40 sides directly faces the outer lens 10. Thus, a substantial portion of the 360 deg. distribution of the LED's 40 maximum intensity is emitted toward the outer lens 10.

However, in such an embodiment, a substantial portion of the sides of each side-emitting LED 40 (and, thus, much of the maximum intensity distribution) will be directed away from the outer lens 10 (e.g., toward the heat sink 30). To redirect this portion toward the outer lens 10, reflectors 200 may be used.

According to an exemplary embodiment, a custom-designed reflective element 200 (hereafter "reflector") is mounted on each LED fastener 20 near the opening 210. Thus, when the LED fasteners 20 are fastened together, each reflector 200 is positioned alongside the emitter 400 of a corresponding side-emitting LED 40.

In particular, each reflector 200 is configured to reflect light from the corresponding side-emitting LED 40 toward a useful direction (i.e., through outer lens 10). The pattern of this reflected light will depend on both the light distribution of each side-emitting LED 40 and the configuration of the reflector 200. For purposes of this description, the configuration of each reflector 200 includes (but is not necessarily limited to) the shape, dimensions, type of material, and relative location of the reflector 200 with respect to the corresponding side-emitting LED 40.

Using well-known techniques, those of ordinary skill in the art can configure the reflectors 200 based on the orientation and distribution characteristics of the side-emitting LEDs 40, so that the reflected light has a desired pattern. Examples of such techniques may include trial and error, computer simulation, or a combination thereof. Techniques for designing the reflectors 200 are readily known to those ordinarily skilled in the art, and do not require undue experimentation to achieve a desired pattern of reflected light.

Accordingly, the light distributions of the side-emitting LEDs 40 may combine with the light from custom-designed reflectors 200 so that a predetermined light pattern is emanated from the rear position light device 1.

As shown in FIG. 1, the reflective surface of each reflector 220 may be curved. The curved shape of each reflector 200 may be determined so that the reflected light has the desired pattern described above.

Although the exemplary embodiment illustrated in FIG. 1 shows a single reflector 200 for each LED 40, the present invention is not thus limited. In alternative exemplary embodiments, the LED fastener 20 may include more than one reflector 200 to produce the desired pattern of reflected light from each side-emitting LED 40. Such alternative configurations will be readily apparent to those of ordinary skill in the art.

In an exemplary embodiment, the reflectors 200 may be integrated into the casting of the LED fasteners 20. However, in alternative embodiments, the reflectors 200 may be detachably mounted on their respective fasteners 20, so that the reflectors can be replaced.

As described above, the custom reflectors 200 are designed to redirect rays of light from the side-emitting LEDs 40, which would normally be emitted away from the outer lens 10. This allows for a greater percentage of the light from the LEDs 40 to be directed through the outer lens 10, thereby allowing the pattern of light from the rear position light device 1 to achieve higher intensities. In other words, more light is emitted within the angular range corresponding to predetermined maximum angular intensity requirements for the rear position light device 1.

Accordingly, the configuration of LEDs 40 and reflectors 200 can more easily satisfy predetermined requirements for minimum angular intensity, such as those specified in the FARs. In addition, optical treatments 120 may also be implemented within the outer lens 10 to help ensure that the device 1 emits a suitable pattern of light. The optical treatments 120 and outer lens 10 will be described in more detail below.

According to an exemplary embodiment, the side-emitting LEDs 40 and the reflectors 200 are configured in such a way that the formed pattern of light satisfies the FARs' requirements regarding minimum light intensity. It will be readily apparent to those of ordinary skill in the art how to configure the side-emitting LEDs 210 and reflectors 200, along with optical treatments 120, so that the pattern of light of the rear position light device 1 satisfies the minimum intensity requirements of the FARs.

According to an exemplary embodiment, the side-emitting LEDs 40 are configured to emit a white light whose wavelength satisfies the FAR requirements for rear position lights. Side-emitting LEDs configured to emit such light may be readily obtained on the market.

Electronics Module and Terminal

As shown in FIG. 1, an electronics module 50 and terminal 60 may be attached to the heat sink 30.

According to an exemplary embodiment, the electronics module 50 includes electronic circuitry that electrically connects the LEDs 40 to a power source of the aircraft. In particular, the circuitry in the electronics module 50 may provide an electrical path between the LEDs 40 and the terminal 60. The terminal 60, in turn, may be electrically connected to the leads of the power source.

The electronics module 50 may comprise a circuit card or other type of device, which can be mounted to a surface on the base assembly 320 in the heat sink 30. For example, the electronics module 50 may be mounted using screws or similar fasteners. The terminal 60 may also be attached to another portion of the base assembly 320 using, e.g., screws or the like.

According to an exemplary embodiment, the circuitry of the electronics module 50 may include a passive type of circuitry. Passive circuitry may be sufficient when a DC power source, which has a range of 18 to 32 volts, is available in the aircraft. This is especially true when the aft position light device 1 does not remain turned on for extended periods of time.

However, not all aircraft run on power sources ranging from 18-32 VDC. For example, some aircraft utilize AC power sources. Also, in commercial jets, the forward position lights may be in operation 24 hours a day. In such circumstances, it would be advantageous to use circuitry with active components to ensure that the current supplied to the LEDs 40 remains constant and within acceptable levels. An active components type circuit is also more efficient than passive circuitry and, thus, does generate excessive amounts of heat. Accordingly, active component electronics may be used to reduce the amount of heat to be dissipated.

Thus, in another exemplary embodiment, the electronic circuitry in the electronics module 50 may be configured as a current control device for distributing a constant current to the solid-state light sources 40 attached to the heat sink 30, despite fluctuations in the voltage of the power source. The various configurations of electronic circuitry, including both passive and active components, to implement such current control devices will be readily apparent to those of ordinary skill in the art.

According to an exemplary embodiment, electronics module 50 may be interchangeable with another type of electronics module 50, which contains a different configuration of electronic circuitry.

For example, the rear position light device 1 may initially include an attached electronics module 50 with passive electronic circuitry. However, if it later becomes desirable to use an active current control device, an electronic update by merely replacing the electronics module 50 with another module 30 containing the active circuit. Thus, the modularity of the rear position light device 1 allows for the other modules to be retained when an electronic upgrade is performed.

Outer Lens

According to an exemplary embodiment, the interface portion 315 of the integrated LED and electronic heat sink 30 may be operably attached to an outer lens module 10. As illustrated by FIG. 1, the outer lens 10 may include optical treatments 120. Also, at least one cut-off shield 110 may be integrally connected to the outer lens 10.

Although the outer lens 10 is illustrated in FIG. 1 as with a semicircular shape, the present invention is not thus limited. The present invention covers any shape and configuration for the outer lens 10, as will be contemplated by those of ordinary skill in the art.

According to exemplary embodiments, the outer lens 10 performs a key function of protecting the side-emitting LEDs 40 and the reflectors 200 from the environment while the rear position light device 1 is in operation.

Also, as mentioned above, the optical treatments 120 may function to control the pattern of light transmitted from the LEDs 40 and reflectors 200 in an exemplary embodiment. Particularly, the optical treatments may deflect certain light rays in such a manner that helps ensure that the pattern satisfies the minimum angular intensities, such as those specified in the FARs. Various techniques for designing the optical treatments 120 based on the configuration of LEDs 40 and reflectors 200, in order to achieve a suitable light pattern, are readily known in the art. For example, such treatments may comprise a type of fluting in the outer lens 10.

In an exemplary embodiment, the cut-off shield 110 may be configured to provide angular cut-offs to the pattern of light. Thus, the cut-off shield 110 may prevent the emitted light of the rear position light device 1 from excessively overlapping with the other forward position lights of the aircraft. In particular, the cut-off shield module 10 may be designed to prevent the light pattern from exceeding FAR-specified maximum light intensities in the Areas A and B, which overlap with the light pattern of each forward position light.

In an exemplary embodiment, the cut-off shield 110 may be incorporated into a casting integrally connected to the outer lens 10. For example, this casting may be used for fastening the outer lens 10 to the interface portion 315 of the heat sink 30 using nuts and bolts, screws, etc. According to an exemplary embodiment, this casting may be made of an optically opaque polymer. Alternatively, other suitable types of materials known within the art may be used for the cut-off shield 110.

It should be noted that the configuration of the cut-off shield 110 in FIG. 1 is merely illustrative. Alternative shapes and configurations may be employed, as will be contemplated by those of ordinary skill in the art. In particular, any configuration that prevents the light pattern from excessively overlapping with the other forward position light so that the pattern satisfies the FARs may be used.

Those of ordinary skill in the art will be readily able to design the cut-off shield 110, using well-known techniques and without undue experimentation, to effectively cut-off the light pattern from Areas A and B overlapping with the dihedral angles L and R of the forward position lights. These techniques may include trial and error, computer simulation, or other methods readily apparent to those ordinarily skilled in the art.

Installation and Orientation of the Rear Position Light Device

It should be noted that, if necessary, more than one rear position light device 1 may be installed on an aircraft. Exemplary embodiments where multiple devices 1 are installed may provide increased visibility for the rear position light of the aircraft.

Figure 3:
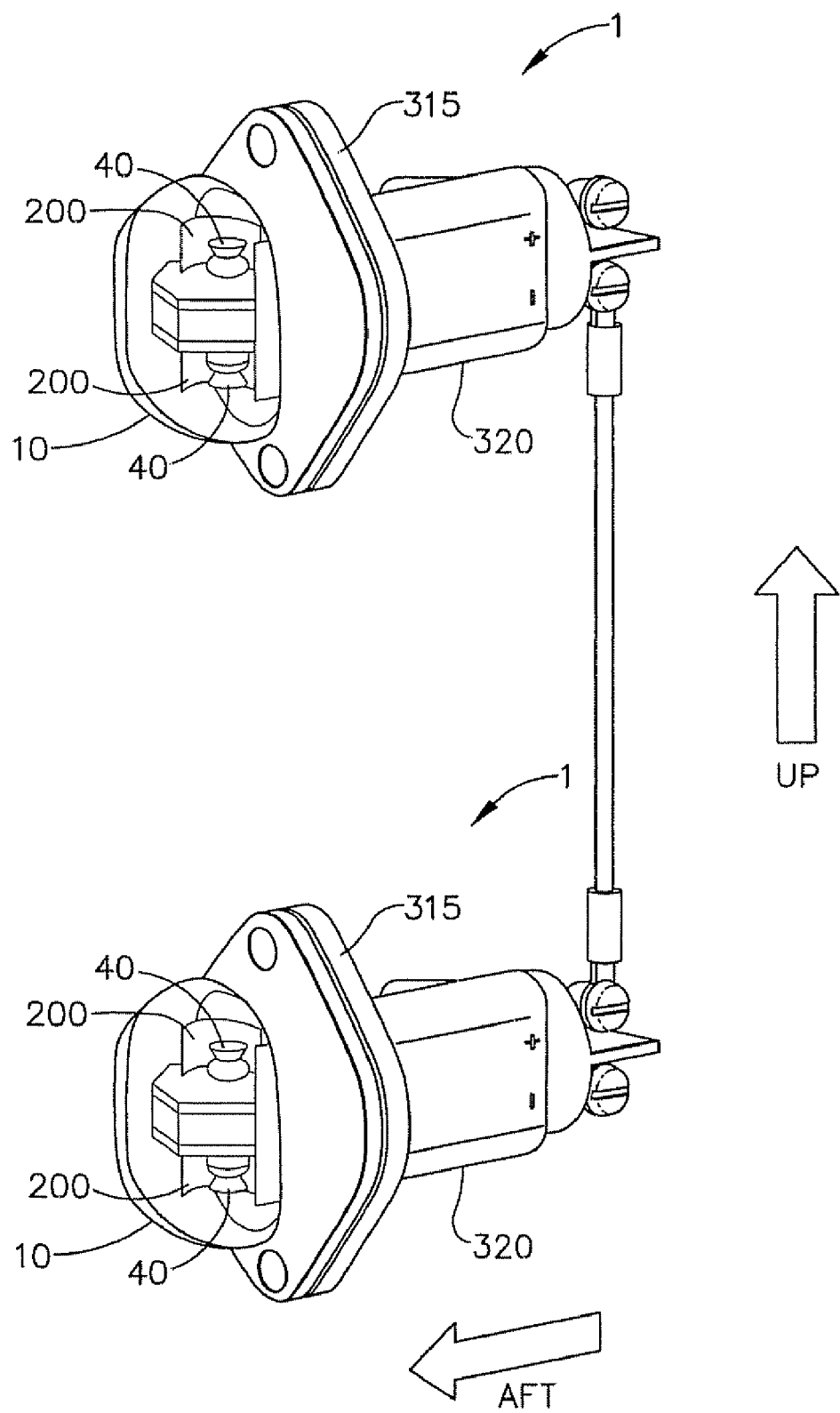
FIG. 3 illustrates the orientation of rear position lighting devices, according to an exemplary embodiment where multiple units are installed on an aircraft.

FIG. 3 illustrates an orientation of multiple rear position light device 1 during operation. In this illustrated embodiment, two devices 1 are installed on an aircraft, in order to emit light toward the aft.

In particular, FIG. 3 illustrates the orientation of the side-emitting LEDs 40 and reflectors 200 in relation to the upward and aft directions of the aircraft. (It should be noted that for purposes of illustration, only a portion of each reflector 200 is shown.) Although the exemplary embodiment of FIG. 3 includes two rear position light devices 1, it will be readily apparent to those of ordinary skill in the art that there may be only one device 1, or more than two devices 1, which are installed on an aircraft.

As shown in FIG. 3, each rear position light device 1 faces the aft of the aircraft. According to an exemplary embodiment, a rear position light device 1 may be mounted on a surface of the aircraft, which provides adequate visibility for the emitted light. As of the time of filing of the present application, FARs allow for a rear position light device to be installed on the aircraft at the wingtip, the tail, or both. Thus, in an exemplary embodiment, the rear position light device 1 may be installed at the wingtips and/or the tail of the aircraft.

The configuration of the reflectors 200, the side-emitting LEDs 40, and outer lens 10 in the rear position light device 1 (as illustrated in FIG. 1) is advantageous because only two LEDs are required for producing a light pattern that satisfies the FARs for rear position lights. This allows the dimensions of the rear position light device 1 to be compatible with a plurality of different mounting platforms for existing rear position lights using incandescent or halogen lamps.

For example, the rear position light device 1 according to exemplary embodiments may be designed to fit within envelope and mounting configurations corresponding to one or more of the following aircraft: Cessna Citation X®, Gulfstream GIV®, Gulfstream GV®, and LearJet® 31A/60. Thus, in an exemplary embodiment, the rear position device 1 may be used to directly replace the existing incandescent/halogen rear position light in the above mounting platforms without retrofitting the device 1 or modifying the platforms.

In other exemplary embodiments, the rear position light device 1 may be configured so that only minor modifications or retrofitting is required to replace conventional incandescent/halogen rear position lights in a plurality of different platforms.

As shown in FIG. 1, the interface portion 315 of the heat sink 30 includes a surface to which the outer lens module's 10 casting is fastened. In an exemplary embodiment, the mechanism for fastening the heat sink 30 to the outer lens 10 may comprise a pair of screws or bolts and nuts. Each set of screws or bolts and nuts that fit through corresponding holes in the interface portion 315 and the outer lens 10.

As shown in FIG. 1, an optional interface bracket 70 may be installed in the aircraft. This bracket 70 may include a pair of holes corresponding to the holes in the outer lens 10 and heat sink 30. Thus, the same fastening mechanism used for fastening the outer lens 10 and heat sink 30 together may also be used to fasten the rear position light device 1 to the aircraft.

Of course, other types of fastening mechanisms may be used to secure the modules 10 and 30 together and to mount the rear position light device 1 to the aircraft, as will be readily contemplated by those of ordinary skill in the art.

It will also be readily apparent to those ordinarily skilled in the art that the modular nature of the rear position light device 1 may facilitate the manufacturing and assembly process, according to exemplary embodiments.

Furthermore, the use of castings to manufacture various modules in the device 1 may simplify the manufacturing process. According to exemplary embodiments, a casting may be used to implement the cut-off shield 110 in the outer lens 10. A casting may also be used to manufacture the various integrated parts of the integrated LED and electronic heat sink 30. Similar castings may further be used for manufacturing other modules in the rear position light device 1, as will be readily contemplated by those of ordinary skill in the art.

What is claimed is:

1. A rear position lighting device configured to be mounted at a rear position light mounting platform of an aircraft, the rear position light mounting platform corresponding to a tail or wing of the aircraft, the device comprising:
    a heat sink;
    a plurality of solid-state light sources operably connected to the heat sink;
    an outer lens through which light from the solid-state light sources is emitted;
    a cut-off shield operably attached to the outer lens, the cut-off shield being configured to limit the light transmitted through the outer lens according to angular cut-off parameters;
    at least two reflectors, each corresponding to one of the solid-state light sources for redirecting the light emitted by the solid-state light sources toward an area of the outer lens exposed by the cut-off shield, wherein each reflector is configured to redirect light from sides of an emitter in the corresponding solid-state light source, so that the redirected light is transmitted through the outer lens; wherein the redirected light from each reflector is directed by the cut-off shield according to the angular cut-off parameters
    at least two fastening modules, each configured to fasten one of the solid-state light sources to the heat sink, wherein each of the reflectors is attached to a corresponding one of the fastening modules;
    wherein during operation, the device is mounted to the rear position light mounting platform of the aircraft, and
    the device is dimensioned to be mountable at the rear position light mounting platforms of multiple types of aircraft, without modifying the corresponding tail or wing, in such a manner that the device fits within the corresponding tail or wing when mounted.

2. The device of claim 1, wherein the solid-state light sources are light-emitting diodes (LEDs) configured to emit a white light.

3. The device of claim 2, wherein at least two of the LEDs are side-emitting LEDs, each side-emitting LED emitting a light around an optical axis incident to a mounting surface of the side-emitting LED such that radiant intensity of the side-emitting LED peaks in the range of 60-100 degrees off the optical axis.

4. The device of claim 3,
    wherein each of the side-emitting LEDs is oriented such that an emitter in the side-emitting LED emits light from the emitter's sides through the outer lens.

5. The device of claim 4, wherein the outer lens includes optical treatments.

6. The device of claim 1, wherein dimensions of the heat sink and the outer lens are compatible with the rear position light mounting platforms of multiple types of aircraft, thereby allowing the device to be mounted to the rear position light mounting platform without retrofitting the device or modifying the corresponding tail or wing.

7. The device of claim 1, wherein a casting of the heat sink comprises cooling fins incorporated in the casting of the heat sink module.

8. A rear position lighting device for an aircraft, which is configured to emit light satisfying a minimum intensity within an angular range, the device comprising:
    a heat sink;
    two side-emitting LEDs operably connected to the heat sink, each having an emitter configured so that light is emitted from the emittert's sides within the angular range; and a cut-off shield configure to limit the reflected light from the two reflectors according to the angular range, and
    two reflectors, each corresponding to one of side-emitting LEDs each reflector being configured to reflect light from the sides of the emitter in the corresponding side-emitting LED, so that the reflected light is transmitted within the angular range,
    wherein each side-emitting LED emits a light around an optical axis incident to a mounting surface of the side-emitting LED such that radiant intensity of the side-emitting LED peaks in the range of 60-100 degrees off the optical axis; and wherein the device is mounted at the rear position light mounting platform of the aircraft.

9. The device of claim 8, further comprising:
    two fastening modules, each fastening module being configured to clamp one of the side-emitting LEDs against the heat sink,
    wherein each of the reflectors is operably attached to a corresponding one of the fastening modules.

10. The device of claim 8, further comprising
    a cut-off shield configured to limit the emitted light of the device according to angular cut-off parameters.

11. The device of claim 10, wherein the angular cut-off parameters is configured to limit overlapping between the emitted light and forward position lights of the aircraft.

12. The device of claim 10, wherein the cut-off shield is operably attached to an outer lens of the device.

13. The device of claim 12, wherein the outer lens is operably attached to the heat sink, and
    the dimensions of the outer lens and heat sink are compatible with each of a plurality of distinct mounting platforms, thereby allowing the device to be mounted to the distinct mounting platform without retrofitting the device or modifying the mounting platform.

14. The device of claim 8, wherein a shape of each reflector is determined based on light-emitting characteristics of the corresponding side-emitting LED.

15. The device of claim 14, wherein each of the reflectors include a curved reflective surface, which is substantially concave with respect to the aft of the aircraft.

16. The device of claim 8, further comprising:
    an interchangeable electronics module operably attached to the heat sink, the electronics module including electronic circuitry for electrically connecting the side-emitting LEDs to a power source within the aircraft, the electronics module being interchangeable with another electronics module having different electronic circuitry.

17. The device of claim 8, wherein a casting of the heat sink incorporates cooling fins.

18. A rear position lighting device for an aircraft, which is configured to emit light satisfying a minimum intensity within an angular range, the device comprising:

a heat sink;

two side-emitting LEDs operably connected to the heat sink, each having an emitter configured so that light is emitted from the emitter's sides within the angular range; and two reflectors, each corresponding to one of side-emitting LEDs, each reflector being configured to reflect light from the sides of the emitter in the corresponding side-emitting LED, so that the reflected light is transmitted within the angular range, and a cut-off shield configure to limit the reflected light from the two reflectors according to the angular range, wherein the device is mounted at the rear position light mounting platform of the aircraft, wherein maximum light intensity from each side-emitting LED is emitted from the sides of the corresponding emitter, such that primary source of light emitted by the device is a combination of the light emitted from the sides of the emitters and the light reflected by the reflectors.

* * * * *

UNITED STATES PATENT AND TRADEMARK OFFICE
CERTIFICATE OF CORRECTION

PATENT NO. : 7,434,970 B2  
APPLICATION NO. : 10/920524  
DATED : October 14, 2008  
INVENTOR(S) : Nicolo F. Machi, Jeffrey M. Singer and Mark A. McKenzie It is certified that error appears in the above-identified patent and that said Letters Patent is hereby corrected as shown below:

Claim 8, Column 12 Lines 10-30 should read:

A rear position lighting device for an aircraft, which is configured to emit light satisfying a minimum intensity within an angular range, the device comprising:
    a heat sink;
    two side-emitting LEDs operably connected to the heat sink, each having an emitter configured so that light is emitted from the emitter's sides within the angular range;
    two reflectors, each corresponding to one of side-emitting LEDs each reflector being configured to reflect light from the sides of the emitter in the corresponding side-emitting LED, so that the reflected light is transmitted within the angular range; and
    a cut-off shield configured to limit the reflected light from the two reflectors according to the angular range, wherein each side-emitting LED emits a light around an optical axis incident to a mounting surface of the side-emitting LED such that radiant intensity of the side-emitting LED peaks in the range of 60-100 degrees off the optical axis, and wherein the device is mounted at the rear position light mounting platform of the aircraft.

Claim 18, Column 14, Line 1 should read:

within the angular range, and a cut-off shield configured

Signed and Sealed this

Thirtieth Day of December, 2008

JON W. DUDAS  
*Director of the United States Patent and Trademark Office*